United States Patent Office 3,247,377
Patented Apr. 19, 1966

3,247,377
SCINTILLATION-TYPE WELL LOGGING DEVICE WITH TWO CRYSTALS RESPONDING SEPARATELY TO THERMAL NEUTRONS AND GAMMA RAYS
Hugh E. Hall, Jr., Houston, Tex., assignor to Texaco Inc., New York, N.Y., a corporation of Delaware
Filed Apr. 12, 1962, Ser. No. 187,103
11 Claims. (Cl. 250—71.5)

The present invention relates generally to the determination of the nature of earth formations. More particularly, it is concerned with measurement of characteristics of earth formations along the traverse of a well bore through irradiation of the formations with neutrons in order to produce certain observable effects which are detected as an indication of such characteristics.

The invention is especially directed toward improvements in neutron well logging for quantitatively determining in situ the presence of hydrogen in liquid-filled earth formations traversed by a bore hole as an improved measure of hydrogen content by eliminating the effects of the presence of other elements, such as chlorine, in earth formations which tend to reduce the quantitative accuracy of such hydrogen determination.

In the logging of bore holes one of the principal characteristics to be measured is the porosity of adjacent formations. In liquid-filled formations the fluid content is either oil or water, the water usually being salt water. Since both oil and water contain hydrogen in similar proportions, 11% by weight for pure water and in the range of 11% to 14% by weight for most crude oils, measurement of the hydrogen content of a liquid-filled formation which contains no bound water, can provide a substantially quantitative indication of the liquid content and therefore of the porosity. Obviously, the more accurately the hydrogen content is measured, the more quantitative will be the porosity values derived therefrom.

In connection with oil well drilling operations it is customary to run logs of the formations traversed by the well bore in order to try to ascertain which of the formations are likely to contain oil and, if they do, how much oil they may contain. Various types of logging methods are commonly used, prominent among which are the so-called neutron logs. Basically the neutron logs are based on the procedure of exposing the formation to bombardment by fast neutrons and detecting the effect of the formations on this nuclear radiation. Several species of neutron logs are used commercially. These are generally classified on the basis of the nuclear radiation detected and in general are dependent upon the thermalizing effect of hydrogen nuclei on the incident fast neutrons. Thus, in a neutron gamma log, fast neutrons from the source are slowed down to thermal energies by collision, predominately with hydrogen nuclei. Gamma radiation emitted as a result of capture of the thermalized neutrons by nuclei in the formations are detected by means of a suitable gamma radiation detector. Hydrogen nuclei present in earth formations capture thermal neutrons with the resulting emission of gamma radiation. If chlorine nuclei are present, for example as sodium chloride dissolved in formation water, the chlorine nuclei also capture thermal neutrons with the emission of gamma radiation. Chlorine has a thermal neutron capture cross section approximately 100 times as great as that of hydrogen and emits an average of about three gamma quanta per neutron captured as compared to one gamma quanta per capture for hydrogen nuclei. In view of its higher capture cross section and higher gamma radiation yield, the presence of even a small amount of chlorine will ordinarily increase the number of gamma quanta detected by a neutron-gammalogging instrument, thus giving a false indication of the hydrogen content of the resulting log.

In neutron-neutron logs, the detected radiation may be thermal neutrons, epithermal neutrons or fast neutrons. The thermal neutron log is based on measuring the thermal neutron flux, in the vicinity of a thermal neutron detector, produced by thermalizing of the original fast neutrons, primarily by hydrogen nuclei in the well bore fluid. The thermal neutrons thus produced diffuse through both the surrounding formations and the bore hole fluid until captured. The distance which these thermal neutrons will diffuse, and therefore the thermal neutron flux or neutron population in the vicinity of the bore hole, is a function of the capture cross sections and amounts of the various elements present. Thus, chlorine has an effect on the response of a thermal neutron log but the effect in this case is in an opposite direction to the effect on a neutron-gamma log. This is due to the fact that chlorine absorbs or removes thermal neutrons from the environment of the logging detector due to the relatively high capture cross section of chlorine. Consequently, the thermal neutron flux in the vicinity of the detector is reduced by increasing amounts of chlorine and the number of neutrons detected is likewise reduced to give a false indication of the amount of hydrogen measured by the thermal neutron log.

It is obvious, therefore, that neither of these neutron logs has a response which is dependent only upon the amount of hydrogen present in the surrounding earth formations without the introduction of compensating factors. For example, while the response of a neutron-gamma log is reasonably accurate for determining the hydrogen content, and therefore porosity, of formations containing oil or fresh water, the accuracy is adversely affected when the formation fluid is salt water. However, the response of a neutron-gamma log may be brought into better agreement with the actual hydrogen content of a formation containing salt water by introducing a thermal neutron component into the response. This may be accomplished in one manner by enclosing the gamma radiation detector with a material, such as cadmium, samarium, etc., which emits detectable gamma quanta upon neutron capture, as set forth in co-pending application Serial No. 820,240, filed June 15, 1959, now abandoned. In this method the increase in gamma radiation flux due to the presence of chlorine nuclei is offset by a decrease in the number of gamma quanta emitted by the cadmium, samarium or similar material enclosing the detector, since the number of gamma quanta emitted by these materials is dependent upon the thermal neutron flux in the vicinity of the detector. The thermal neutron flux in turn is affected by both the hydrogen content and the chlorine content of the formation, but in an opposite direction from the capture gamma flux.

It is an object of this invention to provide apparatus for making a log of a bore hole which is substantially dependent only on the hydrogen content of adjacent liquid-filled formations.

Another object of the invention is to provide a new and novel method for introducing a thermal neutron component into the response of a neutron-gamma log in order to produce a log which is more nearly indicative of the hydrogen content of liquid-filled earth formations traversed by a well bore, and therefore a more truly quantitative measure of the porosity of such formations containing no bound water.

A still further object of this invention is to provide a radiation detector of the scintillation type which is responsive to thermal neutrol capture gamma radiation and to thermal neutrons in proportions such that when used in a logging instrument the log obtained is substantially insensitive to the presence or absence of chlorine atoms in the bore hole and in the formation.

The present invention relates to a novel scintillation type of radiation detector primarily useful for making a combined neutron-gamma and neutron-thermal neutron log of a well bore for determination of the hydrogen content, or porosity, of formations surrounding the well bore and at the same time nullifying the effect of any chlorine nuclei which may be present in the formations.

More specifically the invention relates to a scintillation type of radiation detector comprising a first luminophor element, for example a thallium activated sodium iodide crystal, which is sensitive to a gamma radiation, surrounded by a second luminophor, for example an europium activated lithium iodide crystal, which is sensitive to thermal neutrons. Desirably, when used in a well logging the relative volumes of the two luminophor elements are in a predetermined relationship such that an increase in the response of the gamma radiation detecting luminophor due to the presence of chlorine nuclei in formations adjacent the well bore is substantially compensated by a decrease in the response of the thermal neutron detector with the result that the overall response of the dual luminophor detector is substantially independent of the chlorine content of the adjacent formations.

In another aspect, this invention relates to a radiation detector useful for carrying out a method of logging a well bore wherein the formation is irradiated with fast neutrons, said detector comprising a gamma radiation responsive luminophor and a thermal neutron responsive luminophor optically coupled to a common photomultiplier tube and spaced a fixed distance away from the source of the irradiating fast neutrons to determine the effect of the formations surrounding the well bore on the irradiating neutrons and thus provide a log of the formations traversed by the well bore, which log is primarily dependent upon the hydrogen content of the formations and substantially independent of the chlorine content of the formations.

For a better understanding of the invention, reference may be had to the accompanying diagrams in which.

Figure 1:
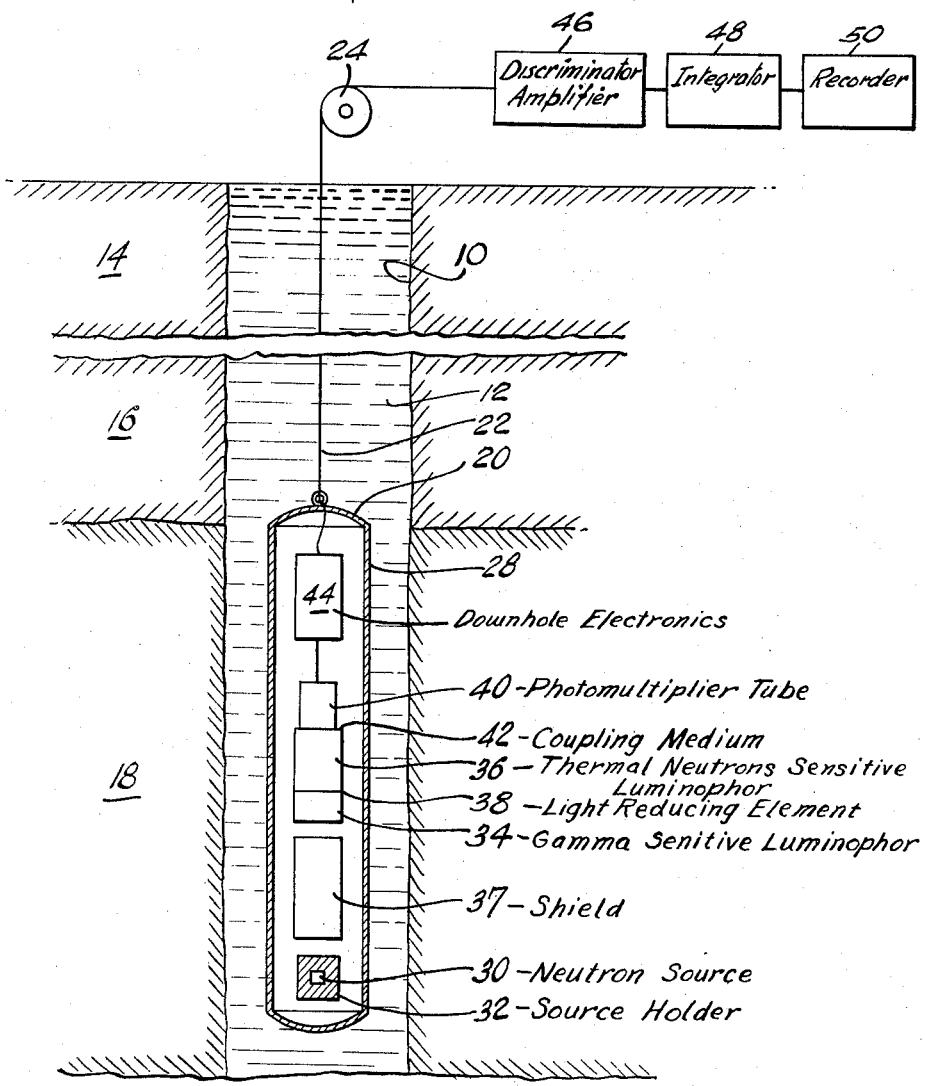
FIGURE 1 is a vertical sectional elevation through a portion of a bore hole in which an instrument is disposed for carrying out the method of the invention.

Referring now to FIGURE 1, there is shown a bore hole 10 containing the usual bore hole fluid 12 and which traverses a series of earth formations 14, 16 and 18 about which logging information may be desired. Within bore hole 10 there is shown a logging instrument or sonde 20 suspended therein by means of a cable 22, running over a measuring wheel 24 for determining the length of cable 22 lowered into the bore hole 10 at any given time. Cable 22 also provides means for electrically coupling sonde 20 to electronic and recording apparatus at the surface which comprises amplifier 46, integrator 48 and recorder 50.

Sonde 20 is provided with a housing 28 formed in accordance with known techniques to withstand the pressures encountered within an earth bore. Within housing 28 and preferably disposed near the lower end thereof is a suitable neutron source 30 contained within source holder 32. Source 30 may be any of the so-called natural sources, such as radium-beryllium and the like, but the low gamma emitting sources such as plutonium-beryllium and radium D-beryllium are preferred. Positioned above source 30 at a fixed predetermined distance are luminophors 34 and 36 with a heavy metal shield 37 between the luminophors 34 and 36 and source 30.

Luminophor 34 is a gamma radiation sensitive scintillator such as a thallium activated sodium iodide crystal or the like. On the other hand, luminophor 36 is thermal neutron responsive scintillator, such as europium activated lithium iodide or the like. A light-reducing element 38 comprising a perforated plate or screen or opaque material or a light filter is positioned between the luminophors 34 and 36 to equalize the intensity, as seen by the photocathode of photomultiplier tube 40, of photons produced by secondary electrons of like energies in luminophors 34 and 36. Since the light output (efficiency of conversion of absorbed energy into photons) for sodium iodide is approximately 8.4 times the output from lithium iodide for secondary electrons of like energizes, the lithium iodide crystal preferably is placed closest to the photomultiplier tube in detectors constructed in accordance with the configurations shown in FIGURE 1. Advantageously, this difference in light outputs may substantially equalized through the use of suitable screens, perforated plates or light filters.

Desirably the relative volumes of luminophors 34 and 36 are adjusted to provide the correct amount of thermal neutron component in the total log response to offset the effect of neutrons being captured by chlorine nuclei in the formation. When employing sodium iodide and lithium iodide as the luminophors, the volume of gamma radiation responsive luminophor 34 should be approximately five times that of thermal neutron luminophor 36 for crystal sizes normally used in well logging. This volumetric relationship is a function of the specific luminophors used, as well as the size and shape of the luminophor crystals.

Photomultiplier tube 40 is positioned above luminophor elements 34 and 36 and is optically coupled to uppermost scintillator 36 by a coupling fluid 42, such as silicone liquid or other material capable of transmitting ultra-violet light in the spectral range of the scintillations produced on luminophors 34 and 36 and having a suitable index of refraction to eliminate reflection losses. By means of the arrangement shown in FIGURE 1, scintillations produced in gamma radiation luminophor 34 as well as those produced in thermal neutron luminophor 36 are detected and amplified by photomultiplier tube 40 and combined into a single signal which is coupled to down hole electronics 44 where the pulses are amplified and transmitted to the surface equipment over cable 22. In the surface equipment the pulses are further amplified in a discriminator type amplifier 46 with the discriminator level set to amplfiy those pulses resulting from the detection of "hydrogen capture" gamma radiation in luminophors 34 and 36.

The amplified pulses are integrated in integrator 48 and recorded on a strip chart type recorder 50 to produce a radioactivity log of bore hole 10 as sonde 20 is passed through the bore hole, preferably in an upwardly direction from the bottom of the well bore to the surface of the ground. Although not shown in the drawing, it is to be understood that a suitable source of electrical power for operation of both the down hole and surface equipment is supplied in accordance with any of the usual methods employed in bore hole logging.

Figure 2:
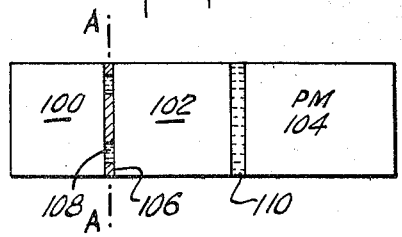
FIGURE 2 is a side view of a two-luminophor scintillation detector of the type shown in FIG. 1 wherein the luminophor elements are cylindrical in shape and are in axial alignment with their associated photomultiplier tube.
Figure 3:
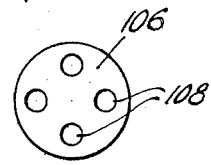
FIGURE 3 is a view of the detector of FIGURE 2 through section A—A'.

FIGURES 2 through 8 show alternative configurations for dual luminophor elements. FIGURE 2 is the same as the arrangement described in FIGURE 1 wherein gamma radiation responsive luminophor 100 and thermal neutron luminophor 102 are in axial relationship with photomultiplier tube 104. One end of thermal neutron luminophor 102 is adjacent photomultiplier tube 104 with gamma radiation responsive luminophor 100 adjacent the other end of luminophor 102. Light reducing element 38 of FIGURE 1 is shown in more detail in FIGURE 3 and optionally may consist of a screen or perforated plate of opaque material provided with openings 108. It may also consist of a light filtering material if so desired. Optical coupling is obtained between the luminophor 102 and photomultiplier tube 104, by coupling fluid 110 which preferably is a transparent substance, such as silicone oil, having a high degree of transmissivity for the light photos produced in luminophors 100 and 102 and a suitable index of refraction such that reflection losses are minimized.

Figure 4:
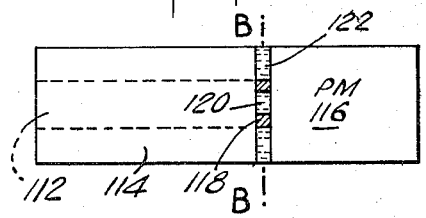
FIGURE 4 is a side view of a scintillation detector comprising concentric cylinders of two different luminophors.
Figure 5:
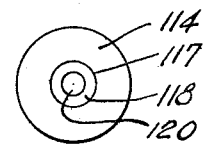
FIGURE 5 is a view of the detector of FIGURE 4 through section B—B'.

FIGURES 4 and 5 show another geometrical arrangement of luminophor elements wherein gamma radiation responsive luminophor 112 is in the form of a solid cylinder surrounded by thermal neutron luminophor 114, which is in the form of an annular cylinder. Luminophor elements 112 and 114 are separated by a reflective, light-impervious shield 117, such as aluminum foil or other suitable material, to shield each luminophor from scintillations produced in the other. Photomultiplier tube 116 is located adjacent one end of the luminophor elements 112 and 114. An annular light reducing element 118 is shown in FIGURE 5 covering the end of gamma radiation luminophor 112 adjacent photomultiplier tube 116 for the purpose of reducing the intensity at the photo-cathode of scintillations originating in luminophor 112. Alternatively, if desired, electrical pulses of equal amplitudes at the output of photomultiplier tube 116 due to detection of gamma quanta of like energies in each of the luminophor elements 112 and 114 may be achieved by adjusting the relative surface areas of luminophor elements 112 and 114 exposed to the cathode of photomultiplier tube 116. If this is done, light reducing element 118 may be eliminated. Optical coupling fluid 122, such as silicone fluid, fills any void space between the ends of luminophors 112 and 114 and the face of photomultiplier tube 116. Although shown in FIGURES 4 and 5 as being annular in shape, if desired, light reducing element 118 may consist of a circular disc containing a plurality of holes rather than one, or it may be a screen, or it also may be a light filter as previously discussed.

Figure 6:
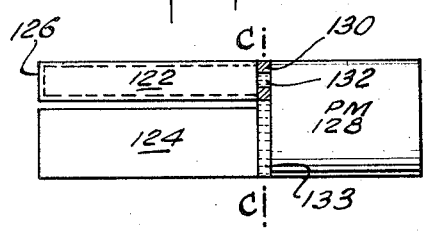
FIGURE 6 is a side view of scintillation detector having two cylindrical luminophor elements side-by-side.
Figure 7:
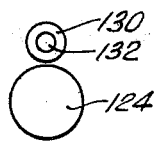
FIGURE 7 is a view of the detector of FIGURE 6 through section C—C'.

FIGURES 6 and 7 are two views of a detector having two luminophors 122 and 124 in the form of cylinders with their ends facing photomultiplier tube 128. In this embodiment gamma radiation luminophor 128 is enclosed in an opaque reflecting shielding material 126, such as aluminum foil on all sides. The end 130 of container 126 facing photomultiplier 128 is provided with openings 132, which may be a single opening as shown in FIGURE 6 or may be a plurality of smaller openings, the open area of which is designed to regulate the intensity of the light output from luminophor 122 so that electrical pulses appearing at the output of photomultiplier tube 128 due to detection of a given energy gamma quanta will be substantially equal in amplitude to electrical pulses appearing at the output of photomultiplier tube 128 due to detection of the same gamma quanta in thermal neutron luminophor 124. Coupling fluid 133, such as silicone oil, fills the space between luminophors 122 and 124 and photomultiplier tube 128.

Figure 8:
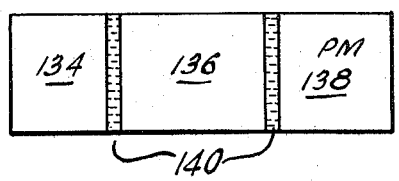
FIGURE 8 is a side view of a scintillation detector wherein the luminophor elements are cylindrical in shape and are in axial alignment with their associated photomultiplier tube, but no light compensating element is provided.

FIGURE 8 is a side view of a dual luminophor detector similar in overall configuration to the detector shown in FIGURE 2. However, the detector of FIGURE 8 does not provide means for equalizing the intensity of the light outputs from the two luminophor elements to produce electrical pulses of equal amplitude at the output of the photomultiplier tube for scintillations produced by secondary electrons of like energies in each of the two luminophors. Thus, in FIGURE 8 gamma radiation luminophor 134 and thermal neutron 136 are in axial alignment with photomultiplier tube 138. Elements 134, 136 and 138 are optically coupled by means of a suitable coupling fluid 140, such as silicone oil, between each of the individual elements.

In conducting a logging operation in accordance with the present invention a neutron log is obtained which is not substantally influenced by the presence or absence of chlorine in the vicinity of the logging instrument. This is achieved by including in the recorded log as the logging instrument is passed through the bore hole: (1) a response due to the detection of gamma quanta herein referred to as "hydrogen capture gamma", emitted by hydrogen and other nuclei in the vicinity of the logging detector as a result of thermal neutron capture by these nuclei; (2) a response due to the detection of gamma quanta, herein referred to as "chlorine capture gammas," emitted by chlorine nuclei in the vicinity of the logging detector as a result of thermal neutron capture by these nuclei; and (3) a response due to the detection of thermal neutrons in the vicinity of the detector. When these three responses are combined in proper proportions the increase in the total gamma radiation component due to increasing amounts of chlorine within the surrounding volume influencing the log response is substantially compensated by a decrease in the thermal neutron component. In this invention the desired response to these three components of the resulting log is achieved by using a scintillation detector comprising at least two different luminophors and adjusting the bias or discriminator level of the associated discriminator amplifier to pass through and amplify pulses originating in the scintillation detector due to the detection of the three desired types of radiation mention above and reject lower energy pulses which do not contribute to the desired response.

In the present invention, one of the luminophors comprising the scintillation detector is primarily responsive to gamma radiation under the conditions of bore hole logging. A preferred luminophor for this purpose is thallium activated sodium iodide. The other luminophor is one which is responsive to thermal neutrons but not necessarily exclusively so. It also may be responsive to gamma radiation. A preferred luminophor for this purpose is europium activated lithium iodide.

Sodium iodide (thallium activated) is a transparent crystal commonly used in connection with a photomultiplier tube as a scintillation counter. Such a counter is sensitive to gamma radiation through the conversion of gamma rays to electrons to light pulses to voltage pulses. The pulse-height output is proportional to the energy of the incident gamma ray. A 2″ diameter by 4″ long sodium iodide crystal is roughly 90% efficient for measuring gamma radiation of intermediate energies. The efficiency of conversion of absorbed energy due to detection of incident radiation into photons is approximately 8.4%.

Lithium iodide (europium activated) also is a transparent crystal and is used in scintillation counters for the detection of thermal neutrons. It also is sensitive to the gamma radiation just as sodium iodide is sensitive to gamma radiation through the conversion of gamma radiation to electrons. Lithium iodide, however, is also sensitive to thermal neutrons through the reaction $Li^6(n,\alpha)H^3+Q$. The total energy release Q for this reaction is 4.78 m.e.v. In this type of crystal an electron, proton, deuteron or triton give off approximately the same amount of light per m.e.v. of energy expanded in the crystal. However, when an alpha particle is detected only 0.4 as much light is given off per m.e.v. of particle energy expended as is given off when electrons are detected. Thus, a light pulse generated as scintillations by products of the $Li^6(n,\alpha)H^3$ reaction does not correspond to an electron energy equal to that of the total energy for the reaction (4.78 m.e.v.), but rather corresponds to an energy of 3.6 m.e.v. This is because the alpha particle gets only 3/7 of the energy, or 2.05 m.e.v., and only 0.4 of this energy results in light. Thus, the alpha particle gives a light pulse of only 0.82 m.e.v. The triton ($H^3$) gets 4/7 of the energy and gives a light pulse of 2.75 m.e.v. Thus, the amplitude of light pulse per thermal neutron detected is equivalent to approximately 3.6 m.e.v. electron energy.

Since lithium has a cross section of 71 barns, there is 95% absorption of thermal neutrons in a thickness of 2 cm. The efficiency of conversion of absorbed energy due to the detection of incident radiation into photons is approximately 1%.

In combining the response of two luminophors to achieve the objective of the invention at least three factors influence the proportion of gamma radiation and thermal neutron components in the resulting log. These are the relative volumes and detection efficiencies of the luminophors, the relative intensities of the light outputs from each reaching the photocathode of the associated photomultiplier tube, and the bias applied to the associated electronic circuits.

The relative volumes are, of course, dependent both upon the detection efficiencies of the luminophors for the "desired radiations" and upon the relative proportions of each of the desired radiations required to produce a log which is independent of the presence or absence of chlorine in the vicinity of the logging instrument. The method of calculation given below may be employed to determine the relative volumes when the two preferred luminophors, namely sodium iodide and lithium iodide are employed, and where the intensity of light photons reaching the photocathode of the photomultiplier tube is substantially the same for photons emitted from either luminophor due to secondary electrons of equal energies. Since these calculations are based on actual measurements with each of the luminophors under identical conditions in the absence and in the presence of chlorine, detection efficiencies are inherently taken into account in the observed counting rates and need not be considered as an independent factor.

The ratio of the volume of the gamma radiation luminophor to the volume of the thermal neutron luminophor for two specific luminophors should be such as to establish a system which is insensitive to variations in the chlorine content of the well bore and surrounding formations. Thus, a logging system using a two inch diameter by four inch long (12.6 cubic inches) sodium iodide crystal with the amplifier bias set to amplify pulses due to gamma rays of 1.8 m.e.v. and higher energies has a counting rate of 200 counts per second in a well bore with no chlorine present in the vicinity of the logging instrument. Under similar conditions, but with brine in the bore hole and formation, the counting rate increased to 320 counts per second, or 25.4 counts per cu. in. per second. Under identical conditions a logging instrument containing a one inch diameter by two inch long (1.57 cubic inches) lithium iodide crystal has a counting rate of 420 counts per second with no chlorine present in the vicinity of the instrument and 200 counts per second with brine in the bore hole and formation when biased to primarily detect thermal neutrons.

The relative proportions of each of these two luminophors required to eliminate the effect of the presence of chlorine may be calculated from the above data in the following maner:

Let—

$N_{CLi}$=decrease in counts/sec./cu. in. for LiI crystal in going from oil to salt water when LiI counts are primarily thermal neutrons $N_{CNaI}$=increase in count/sec./cu. in. for NaI crystal in going from oil to salt water when system is biased at 1.8 m.e.v.

$V_{Li}$=volume of LiI crystal in composite detector, in cu. in.

$V_{NaI}$=volume of NaI crystal in composite detector, in cu. in.

$V_T$=total volume of composite detector in cu. in.
It is desired that
$$N_{CLi}V_{Li}=N_{CNaI}V_{NaI}$$
From the above presented data,
$N_{CNaI}$=9.5 counts/sec./cu. in.
$N_{CLi}$=140 counts/sec./cu. in.
Thus
$$140\ V_{Li}=9.5\ V_{NaI}$$
or
$$V_{NaI}=14.7\ V_{Li}$$

Under these conditions a dual luminophor which comprises sodium iodide and lithium iodide in a ratio of 15 to 1 will effectively eliminate any effect of the presence or absence of chlorine on the resulting log.

For other luminophors the volume ratio of the gamma radiation and thermal neutron detecting luminophors may vary from this figure but can be readily determined for any combination of luminophors by the method described above.

One embodiment of the present invention would be to force pulses originating from like radiations, for example 2.2 m.e.v. gamma radiation, in each of the two luminophors to be substantially equal in amplitude at the input of the discriminator amplifier (46 of FIG. 1). This is accomplished by regulating the relative amounts of light reaching the photocathode of the photomultiplier tube by one of several methods or by a combination thereof.

In the case where sodium iodide (thallium activated) and lithium iodide (europium activated) crystals are employed as the gamma radiation luminophor and the thermal neutron luminophor respectively, the efficiency of conversion ($C_{IP}$) of absorbed energy in sodium iodide due to dissipation of energy the gamma radiation being detected is about 8.4 times that of the conversion efficiency ($C_{IP}$) in lithium iodide. Consequently, for exciting electrons of like energies in these two crystals the amount of light reaching the photocathode of the associated photomultiplier tube tube will be about 8.4 times as intense for the sodium iodide scintillations as for scintillations originating the lithium iodide if the surface area of the two crystals exposed to the photomultplier are the same. Obviously electrical pulses at the output of the photomultiplier will differ in relative amplitudes by the same order of magnitude.

One of the methods by which the intensity of scintillations originating in two luminophors having unlike electron to photon conversion efficiencies may be substantially equalized, as seen by the photocathode of the photomultiplier tube, is to reduce the area seen by the photocathode of the luminophor with the highest conversion efficiency. Another method is to interpose a light filter between the luminophor having the highest conversion efficiency and the photocathode to reduce the intensity of the transmitted light reaching the photocathode.

In the embodiments shown in FIGURES 2 and 3, 4 and 5, and 6 and 7 this equalization may be effectively achieved through the use of perforated plates or a hole in a sheet of foil, screens, covering the surface of the highest conversion efficiency luminophor facing the photocathode. Thus, in the drawing, elements 106, 118 and 132 might consist of a perforated plate or disc of metal, fibrous, opaque plastic or other light impervious substance having holes or openings through which the light scintillations are transmitted to the photocathode. Also, a wire mesh type screen having the desired ratio of open area to solid area may be used if so desired. Since the pulse size from a photomultiplier tube varies directly with the area of the photocathode exposed to the crystal, up to the maximum diameter of the crystal, the ratio of the area of the holes or openings to the total area of a crystal having a diameter equal to that of the photocathode will be in direct relation to the conversion efficiencies of the two luminophors being used. In the case of sodium and lithium iodides this ratio is approximately 1 to 8.4.

Instead of employing a screen or perforated element for lighting equalization, essentially comparable results may be obtained by using a light filter between the highest efficiency luminophor and the photocathode, for example, in the drawings elements 106, 118 and 130 might consist of glass or plastic discs having a reduced transmissivity for ultraviolet light in the spectral range of the scintillations produced and of such thickness that the intensity of the scintillations from the gamma radiation luminophor would be reduced by the desired factor, which factor would be about seven-eighths in the case of the NaI-LiI combination.

It also is possible to obtain a well log in which the effect of chlorine in the vicinity of the detector is substantially reduced by using a detector arrangement, such as that shown in FIGURE 8, which does not employ means for equalizing the light intensity of photons reaching the photomultiplier tube photocathode from scintillations resulting from secondary electrons of like energies in two luminophors having different electron to photon conversion efficiencies, such as in the case of sodium iodide and lithium iodide. Due to the difference in the light outputs from such luminophors, however, a specific discriminator bias on the discriminator amplifier does not result in discriminating between incident radiation of the same energy level detected in both the luminophors. For example, thermal neutron capture gamma radiation from hydrogen nuclei have energies of about 2.2 m.e.v. These are detected with approximately the same efficiencies in both lithium iodide and sodium iodide but due to the higher electron-to-photon conversion efficiency in sodium iodide the resulting electrical pulses from sodium iodide reaching the discriminator amplifier will have amplitudes from about 8 to 9 times as large as similar pulses originating in lithium iodide assuming equal equivalent surface areas. Consequently, if the discriminator level is adjusted to about 3 m.e.v. to amplify pulses due to the detection of thermal neutrons in the lithium iodide, the equivalent energy rejection level for pulses originating in sodium iodide is about 0.35 m.e.v. Fitting the amplifier discriminator at this level results in a log constituted of the thermal neutrons and gamma radiation of 3 m.e.v. or higher energies detected in lithium iodide plus all radiation above 0.35 m.e.v. detected in the sodium iodide. This includes natural gamma radiation, as well as the desired "hydrogen capture" and higher energy gamma radiation. Consequently, such a log differs primarily from a log obtained by incorporating a light reducing element between the sodium iodide crystal and the photomultiplier tube in that it does not include hydrogen capture gammas detected in the lithium iodide and does contain weaker radiations having energies between about 0.35 and 2.2 m.e.v. detected in the sodium iodide. By employing luminophors having suitable volumetric ratios a useful log may be obtained. It is advisable to shield the NaI crystal by a neutron absorbing material which does not emit gamma radiation above 0.35 m.e.v. to prevent activation in the NaI crystal. Lithium-6 is such a material.

Because of this difference in the constitution of the resulting log, the preferred volumetric ratio of the gamma radiation luminophor to the thermal neutron luminophor for eliminating the influence of chlorine on the resulting log differs from the preferred ratio previously given for detectors systems incorporating a light equalizing element and may be calculated in a similar manner for sodium iodide and lithium iodide as that used in the previous example with the exception that $N_{CNaI}$ and $N_{CLi}$ may be different. $N_{CNaI}$ can be determined experimentally for well logging purposes. Using the same $N_{CLi}$ for equal areas exposed to the photomultiplier tube, the increase in $N_{CNaI}$ has been found experimentally to be approximately six for a typical logging arrangement.

In this example, a ratio of 2.5 volumes of sodium iodide to 1 volume of lithium iodide will provide cancellation of the effect of chlorine on the resulting log.

If desired, however, potassium iodide may be used instead of sodium iodide as the gamma radiation luminophor and lithium iodide as the thermal neutron detector. Since the electron-to-photon conversion efficiencies of potassium iodide and lithium iodide are substantially equal, the composition of a log obtained with the detector arrangement of FIGURE 8 without a light equalizing element will correspond rather closely in the spectrum of recorded information to a log obtained with the detector arrangement of FIGURE 2 when using sodium and lithium iodies with a light reducing element between the sodium iodide crystal and the photomultiplier tube.

In conducting a neutron log of a bore hole with both a gamma radiation luminophor and a thermal neutron luminophor, for example, a detector comprising lithium and sodium iodides in 15 to 1 volumetric proportions in combination with a photomultiplier with light output equalization, and with the bias of the system set to amplify and record hydrogen and chlorine capture gamma radiation and thermal neutrons detected by the sodium and lithium iodide crystals with rejection of lower energy gamma radiations, a log is obtained which is insensitive to the chlorine content of the bore hole fluid and of the formations traversed by the bore hole. Such a log is primarily dependent upon the amount of hydrogen present to the substantial exclusion of the effect of chlorine nuclei and therefore, is a substantially quantitative porosity log of liquid-filled formations in which there are no chemically bound water molecules.

In the foregoing description of the invention reference has been made to the use of sodium iodide as a preferred luminophor for the detection of gamma radiation and to lithium iodide as a preferred luminophor for the detection of thermal neutrons. While these luminophors are preferred, it is contemplated that other scintillators or luminophors are encompassed within the scope of the invention and may be either solid or liquid as desired. Accordingly, the primarily gamma radiation responsive scintillation element may be an inorganic luminophor such as sodium iodide, potassium iodide, cesium iodide and the like, an organic luminophor such as anthracene, naphthalene, diphenyl, etc.; a plastic type luminophor such as polystyrene containing terphenyl, lucite containing calcium tungstate and similar compositions; or a liquid luminophor such as terphenyl or 2,5-diphenyl-oxazole and the like dissolved in a sutable organic solvent such as toluene, xylene, ethylbenzene, tetrahydronaphthalene, etc.

Similarly, the thermal neutron responsive scintillation element may be an inorganic luminophor such as lithium iodide, lithium fluoride, lithium bromide, zinc sulfide loaded with borazol or boric acid, and the like; a boron or lithium loaded plastic luminophor, or a liquid luminophor such as a solution of borazol in xylene. Obviously, many other suitable luminophors may be substituted for either or both of the preferred materials as desired. In a further embodiment of the invention it is also contemplated that the light shield or filter positioned between the luminophor having the highest conversion efficiency ($C_{IP}$) and the photocathode of the photomultiplier tube may have such properties that sufficient shielding as filtering to produce output light pulses of equal magnitude for equal electron energies is not fully achieved.

While certain specific embodiments have been shown and described, it will be understood that various modifications may be made without departing from the principles of the invention. The appended claims are, therefore, intended to cover any such modifications within the true spirit and scope of the invention.

I claim:

1. Apparatus for logging an earth formation traversed by a bore hole comprising a container adapted to be passed through said bore hole, a source of neutrons located in said container, a first luminophor responsive to thermal neutrons and a second luminophor responsive to gamma radiation located within said container a predetermined distance from said source, means for equalizing the light intensity of scintillations produced in said first and second luminophors by secondary electrons of like energies, photosensitive means optically coupled to said first and second luminophors for detecting and converting said scintillations into electrical pulses, electrical means for amplifying said electrical pulses, discriminator means for adjusting said electrical means to reject pulses produced by the detection of nuclear radiations in said first and second luminophors having amplitudes less than a predetermined value, and means for recording the output of said electrical means as a function of the position of said container in said bore hole.

2. Logging apparatus in accordance with claim 1 wherein the light intensity of scintillations produced in said second luminophor responsive to gamma radiation is substantially greater than the light intensity of scintillations produced in said first luminophor responsive to thermal neutrons due to excitation of said first and second luminophors by secondary electrons of like energies.

3. Logging apparatus in accordance with claim 1 wherein the volume of said second luminophor responsive to gamma radiation is from 2.5 to 15 times greater than the volume of said first luminophor responsive to thermal neutrons.

4. Logging apparatus in accordance with claim 1 wherein said second luminophor responsive to gamma radiation is a sodium iodide crystal and said first luminophor responsive to thermal neutrons is a lithium iodide crystal.

5. In a scintillation type radiation detector having a scintillator section and photosensitive means optically coupled thereto, the improvement wherein said scintillator section comprises a first luminophor responsive to thermal nuetrons and having a given efficiency of conversion of secondary electron energy into photons and a second luminophor responsive to gamma radiation and having a higher efficiency of conversion of secondary electron energy into photons, and light reducing means positioned between said second luminophor and said photosensitive means for substantially equalizing at said photosensitive means the light intensity of photons produced in said first and second luminophors by electrons of like energies.

6. In a scintillation type radiation detector having a scintillator section and photosensitve means optically coupled thereto, the improvement wherein said scintillator section comprises a lithium iodide crystal as a thermal neutron responsive luminophor, a sodium iodide crystal as a gamma radiation responsive luminophor and having a volume from 2.5 to 15 times as great as the volume of said lithium iodide, and light reducing means positioned between said sodium iodide crystal and said photosensitive means for reducing by a factor of from 8 to 10 the light intensity at said photosensitive means of scintillations produced in said sodium iodide crystal.

7. Logging apparatus in accordance with claim 1 wherein said first luminophor and said second luminophor are of predetermined relative volumes such that the increase in counts per unit volume per unit time for the detection of induced gamma-radiation in said first luminophor when located in a salt-water bearing zone as when said first luminophor is located in an oil-bearing zone to a salt-water bearing zone of the same hydrogen content substantially equal to the decrease in counts per unit volume per unit time for the detection of thermal neutrons in said second luminophor when located in said salt-water bearing zone as when said second luminophor is located in said oil-bearing zone of equal hydrogen content.

8. In a system for conducting a radioactivity well log comprising a logging instrument adapted to be passed through a bore hole traversing a plurality of earth formations, said instrument including means comprising a source of neutrons for irradiating earth formations along the traverse of the bore hole, radiation detecting means quantitatively sensitive to the intensity of radiations occurring in the bore hole as a result of the irradiation of the earth formations by neutrons from said source, said detecting means including means for deriving a signal which varies as a function of radiation resulting from said irradiation and which varies primarily due to the hydrogen content of the irradiated formations to the substantial exclusion of the influence of chlorine which may be present, said detecting means comprising means for selectively detecting the combination of a first radiation component consisting essentially of neutron-induced gamma radiation resulting from said irradiation which varies in intensity as a function of said hydrogen content and which also varies due to the presence of chlorine together with a predetermined quantity of a second radiation component consisting essentially of thermal neutron radiation resulting from said irradiation and which varies in intensity inversely with the variations of said first radiation component due to the presence of chlorine, said detecting means including a first luminophor means for detecting said first radiation component consisting essentially of neutron induced gamma radiation and second luminophor means for detecting said second radiation component consisting essentially of thermal neutron radiation, said detecting means further including photosensitive means for providing an output signal which varies as a function of the radiations detected by both said first and second luminophors, and means operatively coupled to said detecting means for utilizing said signal which varies as a function of the combination of said first and second radiation components detected thereby and which varies primarily as a function of said given characteristic to the substantial exclusion of the influence of chlorine which may also be present.

9. In the method of neutron-gamma radiation well logging involving passing a logging instrument containing a source of fast neutrons through a bore hole to irradiate the formations traversed by the bore hole, detecting neutron-induced gamma rays resulting from said irradiation, providing a signal display proportional to the intensity of the detected said induced gamma radiation in correlation with the position of the detector in the bore hole as a quantitative indication of the hydrogen content of the irradiated formations and wherein the neutron-gamma radiation log is compensated for the effect of the presence of chlorine in the vicinity of said logging instrument by simultaneously detecting a predetermined percentage of said thermal neutrons resulting from said fast neutron irradiation in the vicinity of said logging instrument, the improvement comprising detecting said neutron-induced gamma radiation in a first luminophor, detecting said thermal neutrons in a second luminophor, simultaneously detecting scintillations produced in said first and second luminophors due to said induced gamma radiation and said thermal neutrons respectively with a common photosensitive device, deriving from said device a single composite output signal and employing said composite signal to produce a neutron-gamma radiation log which is compensated for the adverse effect of the presence of chlorine in the vicinity of said logging instrument and is indicative of the true hydrogen content of said formatons.

10. In the method of neutron-gamma radiation well logging involving passing a logging instrument containing a source of fast neutrons through a bore hole to irradiate the formations traversed by the bore hole, detecting neutron-induced gamma rays resulting from said irradiation, providing a signal display proportional to the intensity of the detected said induced gamma radiation in correlation with the position of the detector in the bore hole as a quantitative indication of the hydrogen content of the irradiated formations and wherein the neutron-gamma radiation log is compensated for the effect of the presence of chlorine in the vicinity of said logging instrument by simultaneously detecting a predetermined percentage of said thermal neutrons resulting from said fast neutron irradiation in the vicinity of said logging instrument, the improvement comprising detecting said neutron-induced gamma radiation in a first luminophor, detecting said thermal neutrons in a second luminophor, substantially equalizing the light intensities of scintillations produced in said first and second luminophors by secondary electrons of like energies, simultaneously detecting said equalized scintillations produced in said first and second luminophors due to said induced gamma radiation and said thermal neutrons respectively with a common photosensitive device, deriving from said device a single composite output signal and employing said composite signal to produce neutron-gamma radiation log which is compensated for the adverse effect of the presence of chlorine in the vicinity of said logging instrument and is indicative of the true hydrogen content of said formations.

11. In the method of neutron-gamma radiation well logging involving passing a logging instrument containing a source of fast neutrons through a bore hole to irradiate the formations traversed by the bore hole, detecting neutron-induced gamma rays resulting from said irradiation, providing a signal display proportional to the intensity of the detected said induced gamma radiation in correlation with the position of the detector in the bore hole as a quantitative indication of the hydrogen content of the irradiated formations and wherein the neutron-gamma radiation log is compensated for the effect of the presence of chlorine in the vicinity of said logging instrument by simultaneously detecting a predetermined percentage of said thermal neutrons resulting from said fast neutron irradiation in the vicinity of said logging instrument, the improvement comprising detecting neutron-induced gamma radiation in a first region primarily sensitive to gamma radiation with the production of light photons and wherein the presence of chlorine in the vicinity of said logging instrument results in an increase in counting rate, detecting said thermal neutrons in a second region sensitive to thermal neutrons with the production of light photons and wherein the presence of chlorine in the vicinity of the logging instrument results in a decrease in counting rate substantially equal in magnitude to said increase in counting rate in said first region, simultaneously converting light photons produced in said first and second regions due to the detection of neutron-induced gamma radiation and thermal neutrons into electrical pulses in a common light-to-electricity conversion device to produce a single composite output signal and employing said composite signal to produce a neutron-gamma radiation log which is compensated for the adverse effect of the presence of chlorine in the vicinity of said logging instrument and is indicative of the true hydrogen content of said formation.

References Cited by the Examiner
UNITED STATES PATENTS

| | | | |
|---|---|---|---|
| 2,910,592 | 10/1959 | Armistead | 250—71.5 |
| 2,937,278 | 5/1960 | Copland | 250—71.5 |
| 3,041,454 | 6/1962 | Jones et al. | 250—71.5 |

RALPH G. NILSON, *Primary Examiner.*

ARCHIE R. BORCHELT, *Examiner.*